United States Patent
Olson et al.

(10) Patent No.: US 7,571,284 B1
(45) Date of Patent: Aug. 4, 2009

(54) OUT-OF-ORDER MEMORY TRANSACTIONS IN A FINE-GRAIN MULTITHREADED/MULTI-CORE PROCESSOR

(75) Inventors: Christopher H. Olson, Austin, TX (US); Manish Shah, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 544 days.

(21) Appl. No.: 10/880,965

(22) Filed: Jun. 30, 2004

(51) Int. Cl.
G06F 12/00 (2006.01)
G06F 13/28 (2006.01)
G06F 9/38 (2006.01)

(52) U.S. Cl. .................. 711/122; 711/110; 711/137; 710/22; 710/24; 710/39; 710/52; 718/107; 712/32

(58) Field of Classification Search ............... None
See application file for complete search history.

(56) References Cited

U.S. PATENT DOCUMENTS

| | | | |
|---|---|---|---|
| 5,446,854 A | 8/1995 | Khalidi et al. | |
| 5,465,337 A | 11/1995 | Kong | |
| 5,479,627 A | 12/1995 | Khalidi et al. | |
| 5,596,293 A | 1/1997 | Rogers et al. | 327/142 |
| 5,712,791 A | 1/1998 | Lauterbach | 364/489 |
| 5,717,885 A | 2/1998 | Kumar et al. | |
| 5,742,792 A | 4/1998 | Yanai et al. | |
| 5,761,511 A | 6/1998 | Gibbons et al. | 395/705 |
| 5,761,707 A | 6/1998 | Aiken et al. | |
| 5,802,341 A | 9/1998 | Kline et al. | |
| 5,802,561 A | 9/1998 | Fava et al. | |
| 5,828,860 A | 10/1998 | Miyaoku et al. | |
| 5,842,225 A | 11/1998 | Kohn | |
| 5,860,147 A | 1/1999 | Gochman et al. | |
| 5,862,450 A | 1/1999 | Mandal et al. | 455/3.1 |
| 5,895,487 A * | 4/1999 | Boyd et al. | 711/122 |
| 5,899,994 A | 5/1999 | Mohamed et al. | |
| 5,900,011 A | 5/1999 | Saulsbury et al. | 711/119 |
| 5,911,071 A | 6/1999 | Jordan | 395/701 |

(Continued)

OTHER PUBLICATIONS

R. Heald et al., "A Third-Generation SPARC V9 64-b Microprocessor," IEEE JSSC, Nov. 2000, pp. 1526-1538.

(Continued)

*Primary Examiner*—Hyung S Sough
*Assistant Examiner*—Kaushikkumar Patel
(74) *Attorney, Agent, or Firm*—Osha • Liang LLP

(57) ABSTRACT

A method and apparatus for implementing out-of-order memory transactions in a multithreaded, multicore processor. In the present invention, circular queue comprising a plurality of queue buffers is used to store load data returned by a memory unit in response to a request issued by a processing module, such as a stream processing unit, in a processing core. As requests are issued, a destination queue buffer ID tag is transmitted as part of the request. When the request is returned, that destination number is reflected back and is used to control which queue within the circular queue will be used to store the retuned load data. Separate pointers are used to indicate the order of the queues to be read and the order of the queues to be written. The method and apparatus implemented by the present invention allows out-of-order data to be processed efficiently, thereby improving the performance of a fine grain multithreaded, multi-core processor.

22 Claims, 7 Drawing Sheets

U.S. PATENT DOCUMENTS

| | | | |
|---|---|---|---|
| 5,918,005 A | 6/1999 | Moreno et al. | |
| 5,933,627 A | 8/1999 | Parady | 395/569 |
| 5,953,010 A | 9/1999 | Kampe et al. | 345/348 |
| 5,991,790 A | 11/1999 | Shah et al. | 709/100 |
| 6,016,542 A | 1/2000 | Gottlieb et al. | 712/225 |
| 6,044,446 A | 3/2000 | Joy et al. | |
| 6,092,154 A | 7/2000 | Curtis et al. | 711/137 |
| 6,094,528 A | 7/2000 | Jordan | 395/704 |
| 6,098,169 A | 8/2000 | Ranganathan | 712/227 |
| 6,128,702 A | 10/2000 | Saulsbury et al. | 711/133 |
| 6,141,692 A | 10/2000 | Loewenstein et al. | 709/234 |
| 6,199,142 B1 | 3/2001 | Saulsbury et al. | 711/118 |
| 6,247,121 B1 | 6/2001 | Akkary et al. | 712/239 |
| 6,272,520 B1 | 8/2001 | Sharangpani et al. | 709/108 |
| 6,295,600 B1 | 9/2001 | Parady | 712/228 |
| 6,308,279 B1 | 10/2001 | Toll et al. | 713/323 |
| 6,311,261 B1 * | 10/2001 | Chamdani et al. | 712/23 |
| 6,314,510 B1 | 11/2001 | Saulsbury et al. | 712/213 |
| 6,314,563 B1 | 11/2001 | Agesen et al. | 717/9 |
| 6,374,349 B1 | 4/2002 | McFarling | |
| 6,408,368 B1 | 6/2002 | Parady | |
| 6,493,819 B1 | 12/2002 | Mahurin et al. | |
| 6,535,905 B1 | 3/2003 | Kalafatis et al. | 709/108 |
| 6,553,490 B1 | 4/2003 | Kottapurath et al. | 713/2 |
| 6,578,137 B2 | 6/2003 | Parady | 712/228 |
| 6,609,193 B1 | 8/2003 | Douglas et al. | 712/219 |
| 6,625,654 B1 | 9/2003 | Wolrich et al. | 709/230 |
| 6,631,403 B1 | 10/2003 | Deutsch et al. | 709/217 |
| 6,631,439 B2 | 10/2003 | Susser et al. | 713/201 |
| 6,633,984 B2 | 10/2003 | Susser et al. | 713/201 |
| 6,647,458 B1 | 11/2003 | Glynn | |
| 6,671,707 B1 | 12/2003 | Hudson et al. | 707/206 |
| 6,700,410 B2 | 3/2004 | Ebergen | 326/93 |
| 6,700,825 B1 | 3/2004 | Ebergen | 365/221 |
| 6,718,438 B2 | 4/2004 | Lewis et al. | 711/129 |
| 6,732,143 B1 | 5/2004 | Saulsbury | 709/203 |
| 6,751,655 B1 | 6/2004 | Deutsch et al. | 709/219 |
| 6,766,428 B2 | 7/2004 | Saulsbury et al. | 711/154 |
| 6,772,369 B2 | 8/2004 | Smith et al. | 714/31 |
| 6,779,087 B2 | 8/2004 | Saulsbury et al. | 711/143 |
| 6,802,039 B1 | 10/2004 | Quach et al. | |
| 6,816,961 B2 | 11/2004 | Rice et al. | 712/223 |
| 6,823,473 B2 | 11/2004 | Mukherjee | |
| 6,854,075 B2 | 2/2005 | Mukherjee et al. | |
| 6,862,027 B2 | 3/2005 | Andrews et al. | |
| 7,130,967 B2 | 10/2006 | Arimilli et al. | |
| 2001/0047468 A1 | 11/2001 | Parady | 712/228 |
| 2002/0052926 A1 | 5/2002 | Bush et al. | 709/217 |
| 2002/0087840 A1 | 7/2002 | Kottapalli et al. | |
| 2002/0129309 A1 | 9/2002 | Floyd et al. | 714/724 |
| 2002/0199070 A1 * | 12/2002 | Chaudhry et al. | 711/147 |
| 2003/0088610 A1 | 5/2003 | Kohn et al. | 709/107 |
| 2003/0088713 A1 | 5/2003 | Mandal et al. | |
| 2003/0097578 A1 | 5/2003 | Kohn et al. | 711/5 |
| 2003/0105756 A1 | 6/2003 | Daynes | 707/8 |
| 2003/0105907 A1 | 6/2003 | Kohn et al. | 710/305 |
| 2003/0120825 A1 | 6/2003 | Avvari et al. | 709/316 |
| 2003/0131277 A1 | 7/2003 | Taylor et al. | |
| 2003/0149861 A1 | 8/2003 | Becker | 712/214 |
| 2003/0163645 A1 | 8/2003 | Tremblay et al. | 711/137 |
| 2003/0191927 A1 | 10/2003 | Joy et al. | 712/228 |
| 2003/0212874 A1 | 11/2003 | Alderson | 711/170 |
| 2004/0002974 A1 | 1/2004 | Kravitz et al. | 707/8 |
| 2004/0003208 A1 | 1/2004 | Damron | 712/225 |
| 2004/0003211 A1 * | 1/2004 | Damron | 712/228 |
| 2004/0006633 A1 | 1/2004 | Chandra et al. | 709/231 |
| 2004/0034853 A1 | 2/2004 | Gibbons et al. | 717/174 |
| 2004/0073906 A1 | 4/2004 | Chamdani et al. | 718/102 |
| 2004/0088487 A1 | 5/2004 | Barroso et al. | |
| 2004/0098496 A1 | 5/2004 | Wolrich et al. | |
| 2004/0117600 A1 | 6/2004 | Bodas et al. | |
| 2004/0123028 A1 | 6/2004 | Kanai et al. | |
| 2004/0148472 A1 | 7/2004 | Barroso et al. | |
| 2005/0114856 A1 | 5/2005 | Eickemeyer et al. | |
| 2005/0193283 A1 | 9/2005 | Reinhardt et al. | |

OTHER PUBLICATIONS

"Igniting a Computing Revolution! Throughput Computing," Sun Microsystems Brochure.

"Introduction to Throughput Computing," Sun Microsystems whitepaper, Feb. 2003.

D. Wendell et al., "A 4 MB On-Chip L2 Cache for a 90nm 1.6GHz 64 bit Microprocessor," IEEE JSSC (Feb. 2004).

G. Konstadinidis et al., "Implementation of a Third-Generation 1.1GHz 64b Microprocessor," 2002 IEEE Journal of Solid-State Circuits, vol. 37, No. 11, pp. 1461-1469 (Nov. 2002).

K. Krewell, "Sun Weaves Multithreaded Future," Microprocessor Report, Reed Electronics Group (Apr. 14, 2003).

"UltraSPARC® IV Processor," User's Manual Supplement, Sun Microsystems, version 1.0 (Apr. 2004).

"UltraSPARC® IV Processor," Datasheet, Sun Microsystems.

"The UltraSPARC® IIIi Processor" Architecture Overview, Technical Whitepaper, Sun Microsystems, version 1.2 (Apr. 2004).

"UltraSPARC® IV Processor," Architecture Overview, Technical Whitepaper, Sun Microsystems, Version 1.0 (Feb. 2004).

R. Ronen, "VLSI Architecture Design Course," Lecture #10, Multithreaded Architectures (dated May 2003).

K. Mai et al., "Smart Memories: A Modular Reconfigurable Architecture," Stanford University Proceedings of the $27^{th}$ ISCA (Jun. 2000).

L. Hammond et al., "The Stanford Hydra CMP," IEEE Micro, pp. 71-84 (Mar.-Apr. 2000).

L. Hammond et al., "Considerations in the Design of Hydra: A Multiprocessor-on-a-Chip Microarchitecture," Technical Report No. CSL-TR-98-749, pp. 1-10 (Feb. 1998).

K. Privitt, et al., "Threading: Connecting the Pieces, System Architecture, Application, OS and Tools," Intel Developer Forum (Feb. 17-19, 2004).

J. C. Hoe, "Superscalar Out-of-Order Demystified in Four Instructions," http://www.ece.cmu.edu/~jhoe/distribution/2003/wcae03.pdf, pp. 1-6.

S. Chen et al., "Out-of-Order Memory Accesses Using a Load Wait Buffer," http://www.ece.cmu.edu/~schen1/18-741_final_report.pdf, pp. 1-8.

Mukherjee, S. et al., "Detailed Design and Evaluation of Redundant Multithreading Alternatives," Computer Architecture, 2002, Proceedings 29th Annual International Symposium, pp. 1-12.

Reinhardt, S.K. et al., "Transient Fault Detection via Simultaneous Multithreading," Computer Architecture, 2000, Proceedings of the 27th International Symposium, 12 pages.

Kharbutli, M. et al., "Using Prime Numbers for Cache Indexing to Eliminate Conflict Misses," 10th Annual Symposium on High Performance Computer Architecture, Feb. 14-18, 2004, 12 pages.

Kalla, R. et al., "IBM Power5 Chip: A Dual-Core Multithreaded Processor," Published by the IEEE Computer Society, Mar.-Apr. 2004, pp. 40-47.

Watanabe, K. et al., "Exploiting Java Instruction/Thread Level Parallelism with Horizontal Multithreading," IEEE, 2001, pp. 122-129.

Hennessy, J. et al., "Computer Architecture: A Quantitative Approach." Morgan Kaufmann, third edition, 2002, pp. A-68 to A-77.

Handy, Jim (1998) "The Cache Memory Book," Academic Press Ltd., 2nd Ed., pp. 42-45 and 89-94. (13 pgs.).

Wikipedia, "Thread (Computer Science),"Version as of Jan. 5, 2004. Accessed Jan. 3, 2007, http://en.wikipedia.org/wiki/Thread_(computer science) (2 pgs.).

* cited by examiner

OUT-OF-ORDER MEMORY TRANSACTIONS IN A FINE-GRAIN MULTITHREADED/MULTI-CORE PROCESSOR

BACKGROUND OF THE INVENTION

1. Field of the Invention

The present invention relates generally to the field of processor or computer design and operation. More specifically, the method and apparatus of the present invention relates to memory operations in a multithreaded processor.

2. Description of the Related Art

Computer systems are constructed of many components, typically including one or more processors that are connected for access to one or more memory devices (such as RAM) and secondary storage devices (such as hard disks and optical discs). For example, FIG. 1 is a diagram illustrating a computer system 10 with multiple memories. Generally, a processor 1 connects to a system bus 12. Also connected to the system bus 12 is a memory (e.g., 14). During processor operation, CPU 2 processes instructions and performs calculations. Data for the CPU operation is stored in and retrieved from memory using a memory controller 8 and cache memory, which holds recently or frequently used data or instructions for expedited retrieval by the CPU 2. Specifically, a first level (L1) cache 4 connects to the CPU 2, followed by a second level (L2) cache 6 connected to the L1 cache 4. The CPU 2 transfers information to the L2 cache 6 via the L1 cache 4. Such computer systems may be used in a variety of applications, including as a server 10 that is connected in a distributed network, such as Internet 9, enabling server 10 to communicate with clients A-X, 3, 5, 7.

Because processor clock frequency is increasing more quickly than memory speeds, there is an ever increasing gap between processor speed and memory access speed. In fact, memory speeds have only been doubling every six years-one-third the rate of microprocessors. In many commercial computing applications, this speed gap results in a large percentage of time elapsing during pipeline stalling and idling, rather than in productive execution, due to cache misses and latency in accessing external caches or external memory following the cache misses. Stalling and idling are most detrimental, due to frequent cache misses, in database handling applications such as OLTP, DSS, data mining, financial forecasting, mechanical and electronic computer-aided design (MCAD/ECAD), web servers, data servers, and the like. Thus, although a processor may execute at high speed, much time is wasted while idly awaiting data.

One technique for reducing stalling and idling is hardware multithreading to achieve processor execution during otherwise idle cycles. FIGS. 2a and 2b show two timing diagrams illustrating an execution flow 22 in a single-thread processor and an execution flow 24 in a vertical multithread processor. Processing applications, such as database applications and network computing applications, spend a significant portion of execution time stalled awaiting memory servicing. This is illustrated in FIG. 2a, which depicts a highly schematic timing diagram showing execution flow 22 of a single-thread processor executing a database application. The areas within the execution flow 22 labeled as "C" correspond to periods of execution in which the single-thread processor core issues instructions. The areas within the execution flow 22 labeled as "M" correspond to time periods in which the single-thread processor core is stalled waiting for data or instructions from memory or an external cache. A typical single-thread processor executing a typical database application executes instructions about 25% of the time with the remaining 75% of the time elapsed in a stalled condition. The 25% utilization rate exemplifies the inefficient usage of resources by a single-thread processor.

FIG. 2b is a highly schematic timing diagram showing execution flow 24 of similar database operations by a multi-thread processor. Applications, such as database applications, have a large amount inherent of parallelism due to the heavy throughput orientation of database applications and the common database functionality of processing several independent transactions at one time. The basic concept of exploiting multithread functionality involves using processor resources efficiently when a thread is stalled by executing other threads while the stalled thread remains stalled. The execution flow 24 depicts a first thread 25, a second thread 26, a third thread 27 and a fourth thread 28, all of which are labeled to show the execution (C) and stalled or memory (M) phases. As one thread stalls, for example first thread 25, another thread, such as second thread 26, switches into execution on the otherwise unused or idle pipeline. There may also be idle times (not shown) when all threads are stalled. Overall processor utilization is significantly improved by multithreading. The illustrative technique of multithreading employs replication of architected registers for each thread and is called "vertical multithreading."

Vertical multithreading is advantageous in processing applications in which frequent cache misses result in heavy clock penalties. When cache misses cause a first thread to stall, vertical multithreading permits a second thread to execute when the processor would otherwise remain idle. The second thread thus takes over execution of the pipeline. A context switch from the first thread to the second thread involves saving the useful states of the first thread and assigning new states to the second thread. When the first thread restarts after stalling, the saved states are returned and the first thread proceeds in execution. Vertical multithreading imposes costs on a processor in resources used for saving and restoring thread states, and may involve replication of some processor resources, for example replication of architected registers, for each thread. In addition, vertical multithreading complicates any ordering and coherency requirements for memory operations when multiple threads and/or multiple processors are vying for access to any shared memory resources.

One of the difficulties encountered in a multithread processor is the management of data transaction requests from multiple processor cores to multiple destinations. In a multi-threaded/multi-core processor, each processor core has multiple units e.g., a load-store unit (LSU), an instruction fetch unit (IFU), a memory management unit (MMU) and a cryptographic unit (SPU), which require access to data stored in the Level 2 cache banks and the Non-cacheable unit (NCU). In such an architecture, each processor core is a requester and the L2 cache banks and NCU are destinations. In a given cycle, multiple processor cores can send requests to one destination. A destination, however, can service only one request from one processor core in a given cycle. If a destination is busy servicing a request, then it cannot accept any other requests.

In many multithreaded microprocessors, a stream processing unit (SPU) generates load requests that are sent to the L2 caches via an appropriate interface. The load requests can include key, initialization vectors, and source text. The SPU must process the load data in the same order that the requests were issued. For example, sending source text to a cipher engine that is expecting key data will result in incorrect operation. It is also important for the SPU to be able to order pairs of requests. Misaligned requests where the data spans across the boundaries of the bit width of a buffer can lead to data processing errors.

Accordingly, there is a need for an improved method and apparatus for ensuring efficient improved memory operations for multithreading and/or multiprocessor circuits, particularly for the management of data transaction requests from stream processing units (SPUs) in multiple processor cores to multiple destinations. In particular, there is a need for a system capable of managing load data received in an out-of-order sequence such that the SPU can process the data in a predetermined order.

Further limitations and disadvantages of conventional systems will become apparent to one of skill in the art after reviewing the remainder of the present application with reference to the drawings and detailed description which follow.

SUMMARY OF THE INVENTION

The present invention provides a method and apparatus for efficient memory transactions in a multithreaded processor. More specifically, the present invention provides a method and apparatus for implementing out-of-order memory transactions in a stream processing unit (SPU) in a multithreaded processor. The stream processing unit transmits requests that are managed by an arbitration unit, sometimes hereinafter referred to as a gasket, which manages transactions between the SPU and a bank of L2 caches. The requests from the SPU are transmitted to the gasket in a specified order. The data received in response to the request, however, may be received in a different order than the requests were made.

In the present invention, the SPU comprises a circular queue comprising a plurality of queue buffers. As requests are made by the SPU, the destination queue ID tag is transmitted as part of the request. When the request is returned, that destination number is reflected back to the SPU and controls which queue within the circular queue will be used to store the returned load data. Separate pointers are used to indicate the order of the queues to be read and the order of the queues to be written. In an embodiment of the present invention, the SPU does not process received data until the entry pointed to by the reorder read pointer is valid. If the entries are misaligned and span multiple entries, a common aligner can be used to shift the adjacent queue entries. The method and apparatus implemented by the present invention allows out-of-order data to be processed efficiently, thereby improving the performance of a fine grain multithreaded, multi-core processor.

DETAILED DESCRIPTION

As explained herein, when multiple thread and/or processor operations are using a shared memory system, the memory operations must be coordinated so that each thread can access the memory in an ordered and coherent way with minimal delay or latency. For purposes of providing an exemplary and not limiting description, it will be useful to describe the various aspects and embodiments of the invention herein in the context of memory operations for an on-chip cache memory system that is constructed with CMOS SRAM memory cells. However, the present invention is not limited to CMOS-based processes and may be used in connection with other categories of memory products, including without limitation, DRAM, ROM, flash, PLA and the like, whether integrated within a VLSI system, cache or non-cache, or a stand alone memory device.

Figure 1:
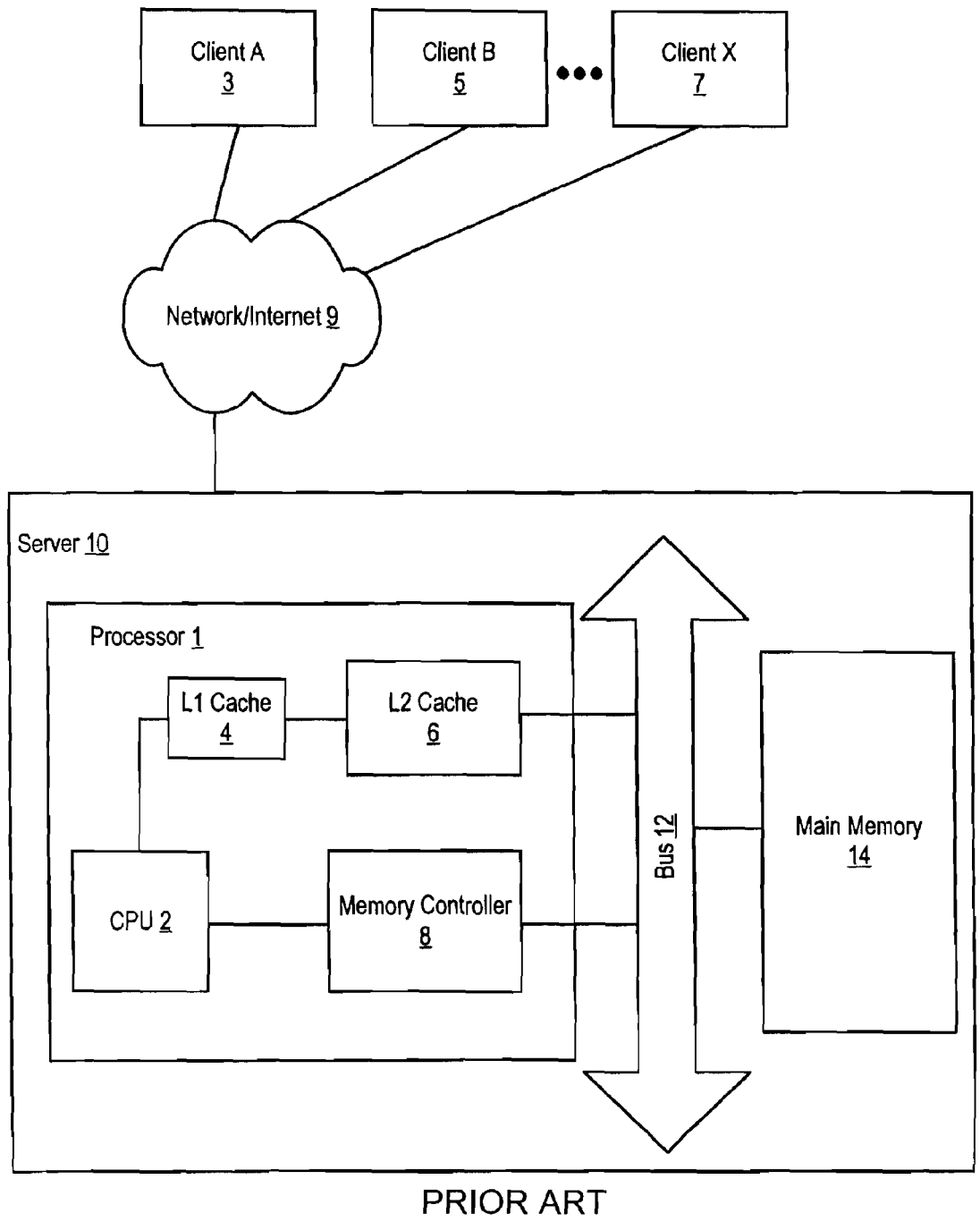
FIG. 1 illustrates a computer system in a communication network.
Figure 2A:
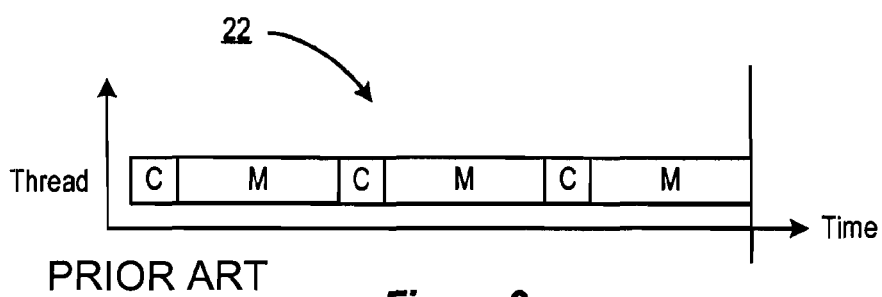
FIGS. 2a and 2b are timing diagrams respectively illustrating execution flows of a single-thread processor and a vertical multithread processor.
Figure 2B:
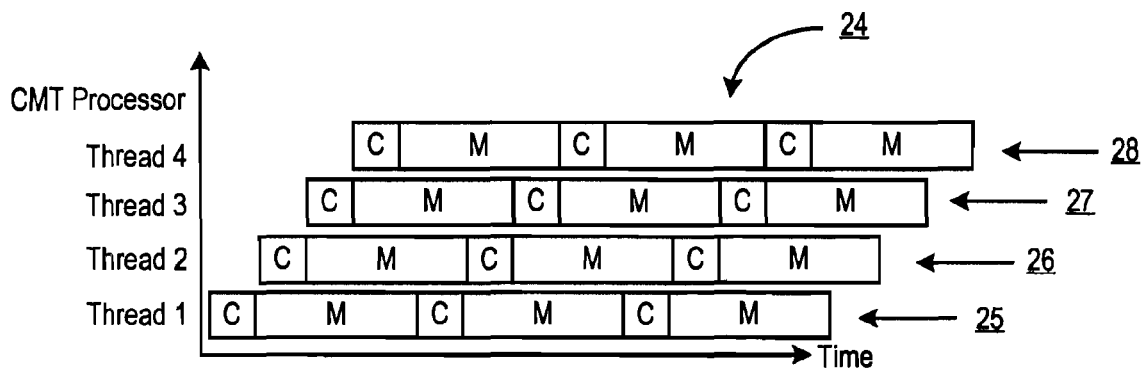
Figure 3:
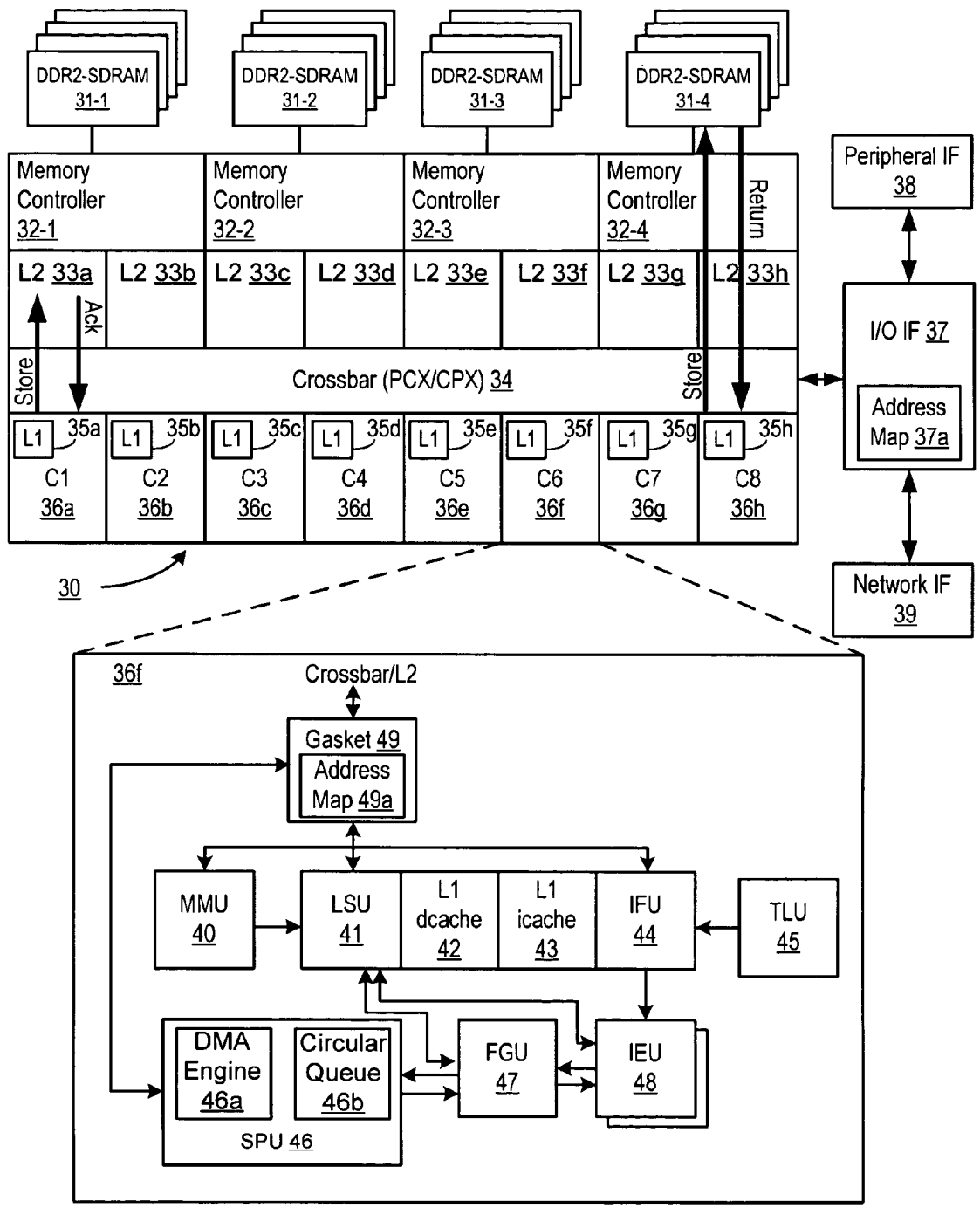
FIG. 3 illustrates a simplified schematic diagram of a processor chip having multiple processor cores for executing multiple threads, wherein each core contains a first level cache and the multiple cores share a second level cache in accordance with an exemplary embodiment of the invention.

A selected embodiment of the present invention is shown in FIG. 3, which depicts a simplified schematic diagram of a processor chip 30 having multiple processor cores for processing multiple threads. In the illustrated embodiment, processor chip 30 includes a plurality of processor cores 36a-h, which are also designated "C1" though "C8." Each of cores 36 is coupled to an L2 cache 33 via a crossbar 34. L2 cache 33 is coupled to one or more memory controller(s) 32, which are coupled in turn to one or more banks of system memory 31. Additionally, crossbar 34 couples cores 36 to input/output (I/O) interface 37, which is in turn coupled to a peripheral interface 38 and a network interface 39.

Cores 36 may be configured to execute instructions and to process data according to a particular instruction set architecture (ISA). In one embodiment, cores 36 may be configured to implement the SPARC V9 ISA, although in other embodiments, it is contemplated that any desired ISA may be employed, such as x86, PowerPC, or MIPS, for example. In a selected embodiment, a highly suitable example of a processor design for the processor core is a SPARC processor core, UltraSPARC processor core or other processor core based on the SPARC V9 architecture. Those of ordinary skill in the art also understand the present invention is not limited to any particular manufacturer's microprocessor design. The processor core may be found in many forms including, for example, the 64-bit SPARC RISC microprocessor from Sun Microsystems, or any 32-bit or 64-bit microprocessor manufactured by Motorola, Intel, AMD, or IBM. However, any other suitable single or multiple microprocessors, microcontrollers, or microcomputers may be utilized. In the illustrated embodiment, each of cores 36 may be configured to operate independently of the others, such that all cores 36 may execute in parallel. In some embodiments, each of cores 36 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core may also be referred to as a multithreaded (MT) core. In an example embodiment shown in FIG. 3, each processor core includes eight threads. Thus, a single processor chip 30 with eight cores (C1 through C8) will have sixty-four threads in this configuration. However, it should be appreciated that the invention is not limited to eight processor cores, and that more or fewer cores can be included. In other embodiments, it is contemplated that the core may process different numbers of threads.

Each processor core 36a-36h is in communication with crossbar 34 which manages data flow between cores 36 and the shared L2 cache 33 and may be optimized for processor traffic where it is desirable to obtain extremely low latency. The crossbar 34 may be configured to concurrently accommodate a large number of independent accesses that are processed on each clock cycle, and enables communication data requests from cores 36 to L2 cache 33, as well as data responses from L2 cache 33 to cores 36. In one embodiment, crossbar 34 may include logic (such as multiplexers or a switch fabric, for example) that allows any core 36 to access any bank of L2 cache 33, and that conversely allows data to be returned from any L2 bank to any core. Crossbar 34 may also include logic to queue memory requests and/or responses, such that requests and responses may not block other activity while waiting for service. Additionally, in one embodiment crossbar 34 may be configured to arbitrate conflicts that may occur when multiple cores attempt to access a single bank of L2 cache 33 or vice versa. Thus, the multiple processor cores 36a-36h share a second level (L2) cache 33 through a crossbar bus 34 (processor to cache and cache to processor, a.k.a. PCX and CPX).

In connection with the example described herein, each processor core (e.g., 36f) shares an L2 cache memory 33 to speed memory access and to overcome the delays imposed by accessing remote memory subsystems (e.g., 31). Cache memory comprises one or more levels of dedicated high-speed memory holding recently accessed data, designed to speed up subsequent access to the same data. When data is read from main memory (e.g., 31), a copy is also saved in the L2 cache 33, and an L2 tag array stores an index to the associated main memory. The L2 cache 33 then monitors subsequent requests for data to see if the information needed has already been stored in the L2 cache. If the data had indeed been stored in the cache (i.e., a "hit"), the data is delivered immediately to the processor core 36 and the attempt to fetch the information from main memory 31 is aborted (or not started). If, on the other hand, the data had not been previously stored in the L2 cache (i.e., a "miss"), the data is fetched from main memory 31 and a copy of the data and its address is stored in the L2 cache 33 for future access.

Figure 4:
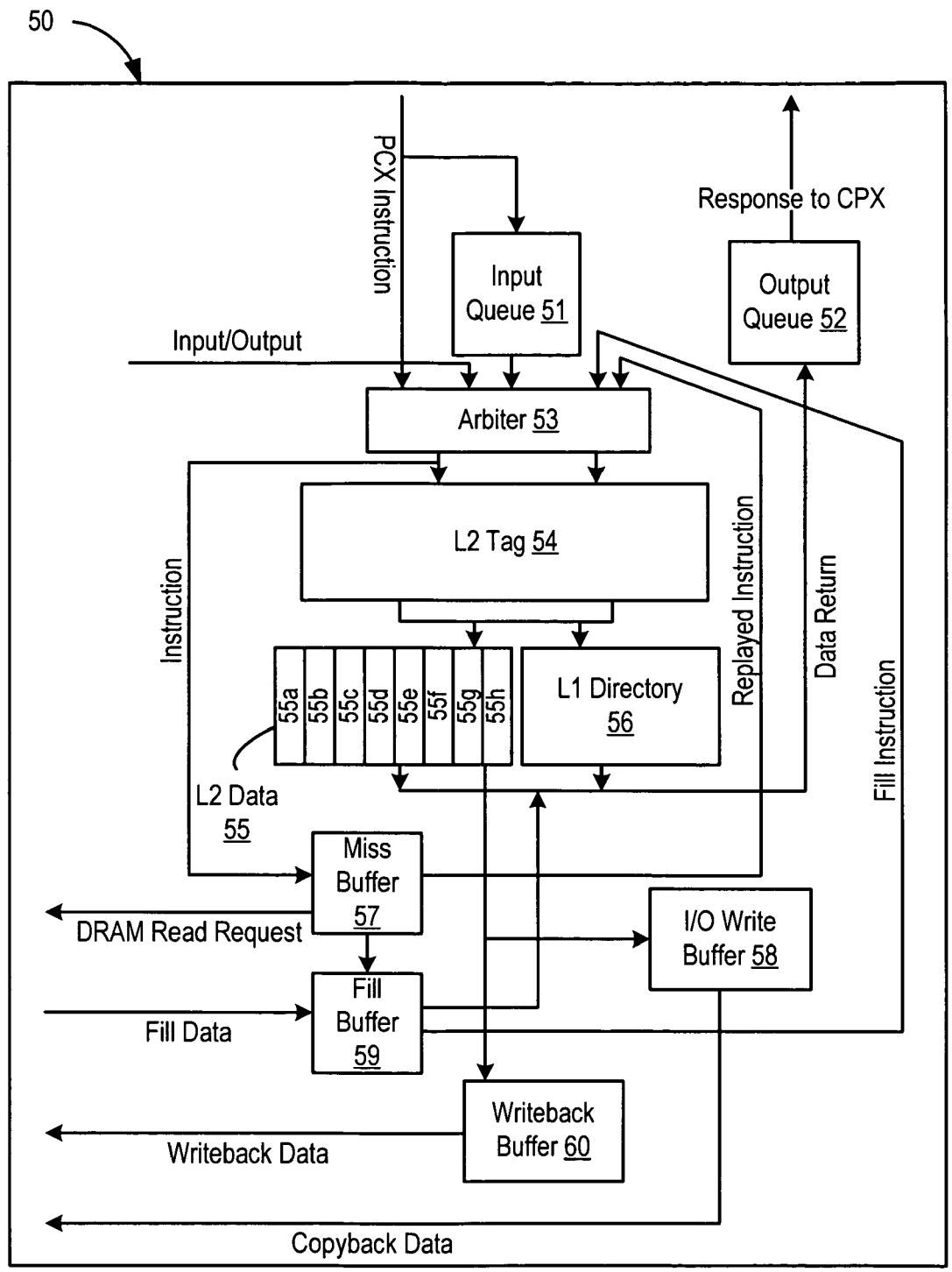
FIG. 4 depicts the organization of a second level cache memory in accordance with an illustrative embodiment of the invention.

The shared L2 cache 33 accepts requests from the processor cores 36 on the processor to cache crossbar (PCX) 34 and responds on the cache to processor crossbar (CPX) 34. As described herein, the L2 cache 33 is also responsible for maintaining coherency across all caches on the chip by keeping a copy of all L1 tags in a directory structure. FIG. 4 depicts the organization of an L2 cache memory 50 in accordance with an illustrative embodiment of the invention. The L2 cache 50 includes eight banks that are shared by the processor cores. It should be appreciated that, by sharing L2 cache banks, concurrent access may be made to the multiple banks, thereby defining a high bandwidth memory system. The invention is not limited to eight L2 cache banks or to any particular size, but the illustrated embodiment should be sufficient to provide enough bandwidth from the L2 cache to keep all of the cores busy most of the time. The L2 cache 50 includes an L2 data array 55 and tag array 54 configured to cache instructions and data for use by cores. In the illustrated embodiment, L2 cache 50 may be organized into eight separately addressable banks that may each be independently accessed, such that in the absence of conflicts, each bank may concurrently return data to any of the processor cores 36a-h. In some embodiments, each individual bank may be implemented using set-associative or direct-mapped techniques. For example, in one embodiment, L2 cache 50 may be a 4 megabyte (MB) cache, where each 512 kilobyte (KB) bank (e.g., 55a) is 16-way set associative with a 64 byte (64B) cache line size, although other cache sizes and geometries are possible and contemplated. L2 cache 50 may be implemented in some embodiments as a writeback cache in which written (dirty) data may not be written to system memory until a corresponding cache line is evicted.

In some embodiments, L2 cache 50 may implement an input queue 51 for holding requests arriving from the crossbar, and an output queue 52 for buffering results to be sent to the crossbar. Additionally, in some embodiments, L2 cache 50 may implement a fill buffer 59 configured to store fill data arriving from memory controller 32, a writeback buffer 60 configured to store dirty evicted data to be written to memory, an I/O write buffer 58 configured to store incoming data from the crossbar in the event of multi-cycle memory write operations and/or a miss buffer 57 configured to store L2 cache accesses that cannot be processed as simple cache hits (e.g., L2 cache misses, cache accesses matching older misses, accesses such as atomic operations that may require multiple cache accesses, etc.). L2 cache 50 may variously be implemented as single-ported or multi-ported (i.e., capable of processing multiple concurrent read and/or write accesses). In either case, L2 cache 50 may implement arbitration logic 53 to prioritize cache access among various cache read and write requesters. While the L2 cache 50 may include a tag array 54 for holding the memory addresses of the L2 cache data array 55, the L2 cache 50 may also advantageously include an additional tag array 54 for holding the memory addresses of each L1 cache data array in each processor core. The additional tag array 54 is referred to as the L1 directory because it maintains a copy of the L1 tags for coherency management and also ensures that the same line is not resident in both the instruction cache and data cache (across all cores). Thus, the L1 directory 56 is split into an instruction cache directory and a data cache directory. On certain data accesses, the L1 directory 56 is CAMed to determine whether the data is resident in L1 caches. The result of this CAM operation is a set of match bits which is used to create an invalidation vector to be sent back to the processor cores.

Referring again to FIG. 3, the L2 cache 33 is in communication with main memory controller 32 to provide access to the external memory 31 or main memory (not shown). Memory controller 32 may be configured to manage the transfer of data between L2 cache 33 and system memory, for example in response to L2 fill requests and data evictions. In some embodiments, multiple instances of memory controller 32 may be implemented, with each instance configured to control a respective bank of system memory. Memory controller 32 may be configured to interface to any suitable type of system memory, such as Double Data Rate or Double Data Rate 2 Synchronous Dynamic Random Access Memory (DDR/DDR2 SDRAM), or Rambus DRAM (RDRAM), for example. In some embodiments, memory controller 32 may be configured to support interfacing to multiple different types of system memory.

In the illustrated embodiment, processor chip 30 may be configured to receive data from sources other than system memory 31. I/O interface 37 may be configured to provide a central interface for such sources to exchange data with cores 36 and/or L2 cache 33 via crossbar 34. In some embodiments, I/O interface 37 may be configured to coordinate Direct Memory Access (DMA) transfers of data between network interface 39 or peripheral interface 38 and system memory 31 via memory controller 32. In addition to coordinating access between crossbar 34 and other interface logic, in one embodiment, I/O interface 37 may be configured to couple processor chip 30 to external boot and/or service devices. For example, initialization and startup of processor chip 30 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor chip 30, before the boot process proceeds to load data from a disk or network device. Additionally, in some embodiments such an external device may be configured to place processor chip 30 in a debug, diagnostic, or other type of service mode upon request.

Peripheral interface 38 may be configured to coordinate data transfer between processor chip 30 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 38 may implement one or more instances of an interface such as Peripheral Component Interface Express (PCI-Express), although it is contemplated that any suitable interface standard or combination of standards may be employed. For example, in some embodiments, peripheral interface 38 may be configured to implement a version of Universal Serial Bus (USB) protocol or IEEE 1394 (Firewire) protocol in addition to or instead of PCI-Express.

Network interface 39 may be configured to coordinate data transfer between processor chip 30 and one or more devices (e.g., other computer systems) coupled to processor chip 30 via a network. In one embodiment, network interface 39 may be configured to perform the data processing necessary to implement an Ethernet (IEEE 802.3) networking standard such as Gigabit Ethernet or 10-gigabit Ethernet, for example, although it is contemplated that any suitable networking standard may be implemented. In some embodiments, network interface 39 may be configured to implement multiple discrete network interface ports.

The multiprocessor chip 30 described herein and exemplified in FIG. 3 may be configured for multithreaded execution. More specifically, in one embodiment each of cores 36 may be configured to perform fine-grained multithreading, in which each core may select instructions to execute from among a pool of instructions corresponding to multiple threads, such that instructions from different threads may be scheduled to execute adjacently. For example, in a pipelined embodiment of core 36f employing fine-grained multithreading, instructions from different threads may occupy adjacent pipeline stages, such that instructions from several threads may be in various stages of execution during a given core processing cycle.

Figure 5:
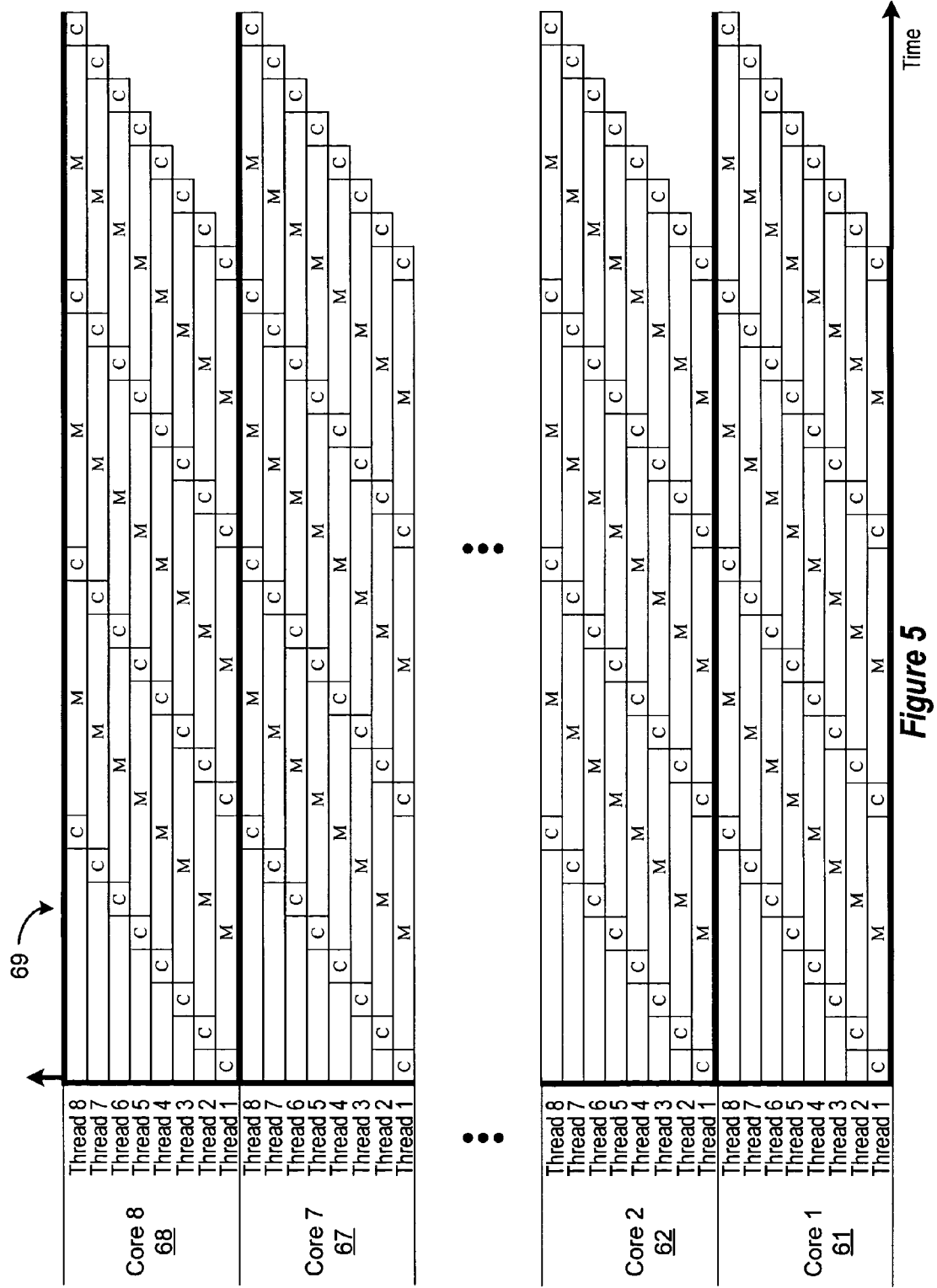
FIG. 5 is a timing diagram illustrating an execution flow of a vertical and horizontal multithread processor in accordance with an illustrative embodiment of the invention.

FIG. 5 is a timing diagram illustrating execution flow of a vertical and horizontal multithread multiprocessor embodiment of the invention using a high throughput architecture with eight processor cores 61-68, each having eight threads. In FIG. 5, the execution flow for a given vertical threaded processor 61 (e.g., Core 1) includes execution of multiple threads (e.g., Threads 1-8). For each thread in each core, the areas labeled "C" show periods of execution and the areas labeled "M" show time periods in which a memory access is underway, which would otherwise idle or stall the processor core. Thus, in the first processor core (Core 1), Thread 1 uses the processor core (during the times labeled as "C") and then is active in memory (during the times labeled as "M"). While Thread 1 in a given core is active in memory, Thread 2 in that same core accesses the processor core and so on for each of Threads 3-8. Vertical multithread processing is implemented by maintaining a separate processing state for each executing thread on a processing core. With only one of the threads being active at one time, each vertical multithreaded processor core switches execution to another thread during a memory access, such as on a cache miss. In this way, efficient instruction execution proceeds as one thread stalls and, in response to the stall, another thread switches into execution on the otherwise unused or idle pipeline. In essence, the pipeline overlaps the execution of multiple threads to maximize processor core pipeline utilization. As will be appreciated, the multiplicity of thread operations from a vertically threaded processor (e.g., core 1) will require a memory system that can process multiple references or threads simultaneously. For example, multiple memory operations must be coordinated so that each thread can access the L2 cache 33 or system memory in an ordered and coherent way with minimal contention, delay or latency.

In accordance with a selected embodiment of the present invention, the processor cores can be replicated a number of times in the same area. This is also illustrated in FIG. 5, which illustrates the timing diagram for an execution flow of a horizontal threaded processor using a technique called chip multiprocessing. This technique combines multiple processor cores on a single integrated circuit die. By using multiple vertically threaded processors—each of which (e.g., Core 1) is vertically threaded—a processor system is formed with both vertical and horizontal threading, augmenting executing efficiency and decreasing latency in a multiplicative fashion. The execution flow 69 illustrated in FIG. 5 for a vertical and horizontal threaded processor includes execution of threads 1-8 on a first processor core (Core 1), execution of threads 1-8 on a second processor core (Core 2), and so on with processor cores 3-8. Execution of threads 1-8 on the first processor core (Core 1) illustrates vertical threading. Similarly, execution of threads 1-8 on the second processor (Core 2) illustrates vertical threading. Where a single system or integrated circuit includes more than one processor core, the multiple processor cores executing multiple threads in parallel is a chip multi-threading (CMT) processor system. The combination of vertical multithreading and horizontal multithreading increases processor parallelism and performance, and attains an execution efficiency that exceeds the efficiency of a processor with only vertical multithreading. The combination of vertical multithreading and horizontal multithreading also advantageously reduces communication latency among local (on-chip) multi-processor tasks by eliminating much signaling on high-latency communication lines between integrated circuit chips. Horizontal multithreading further advantageously exploits processor speed and power improvements that inherently result from reduced circuit sizes in the evolution of silicon processing. However, with the use of vertically and horizontally threaded processors, the coordination requirements for the resulting multiplicity of thread operations from multiple processors (e.g., cores 1-8) will require a memory system that can coordinate multiple memory operations where, for example, each thread must access the L2 cache 33 or system memory in an ordered and coherent way with minimal contention, delay or latency.

In the illustrative embodiment depicted in FIG. 3, each core (e.g., 36f) may be configured to perform fine-grained horizontal multithreading operations. The depicted core 36f includes an instruction fetch unit (IFU) 44 that is coupled to a memory management unit (MMU) 40, a trap logic unit (TLU) 45, and at least one instruction execution unit (IEU) 48. Each of execution units 48 is coupled to both a floating point/graphics unit (FGU) 47 and a load store unit (LSU) 41. Each of the LSU units is also coupled to send data back to each of execution units 48 and FGU unit 47. Additionally, LSU 41, IFU 51 and MMU 40 are coupled to a gasket or interface unit 49 for interface to the crossbar 34. The stream processing unit (SPU) 46 is coupled to the FGU 47 and the gasket 49. The SPU 46 comprises a DMA engine 46a and a circular queue 46b. The DMA engine 46a and the circular queue 46b are operable to service memory transactions between the SPU 46 and the L2 caches 33a-h, as described in greater detail hereinbelow.

As illustrated, each threaded core (e.g., C6 36f) includes a first level (L1) cache (e.g., 35f) which includes a data cache (dcache) segment 42 and an instruction cache (icache) segment 43. In operation, the instruction fetch unit (IFU) 44 retrieves instructions for each thread and stores them in an instruction cache 43 and instruction buffers (not shown). IFU 44 then selects two instructions to execute among eight different threads, and provides the instructions to the decode unit which decodes one instruction each from two thread groups per cycle and supplies the pre-decoded instruction to the execution units 48. Each integer execution unit includes an arithmetic logic unit (ALU), shifter, integer register files for processing and storing thread status information. Execution unit results are supplied via selection circuits to the shared FGU 47 and LSU 41. The shared LSU 41 handles memory references between the processor core, the L1 data cache and the L2 cache. A single data cache 42 may also be provided in the LSU 58. For additional details concerning the design and operation of the processor core and its constituent resources, see co-pending U.S. patent application Ser. No. 10/880,488, entitled "Apparatus And Method For Fine-Grained Multithreading In A Multi-Pipelined Processor Core", filed Jun. 30, 2004, and assigned to Sun Microsystems which is hereby incorporated by reference in its entirety.

Figure 6:
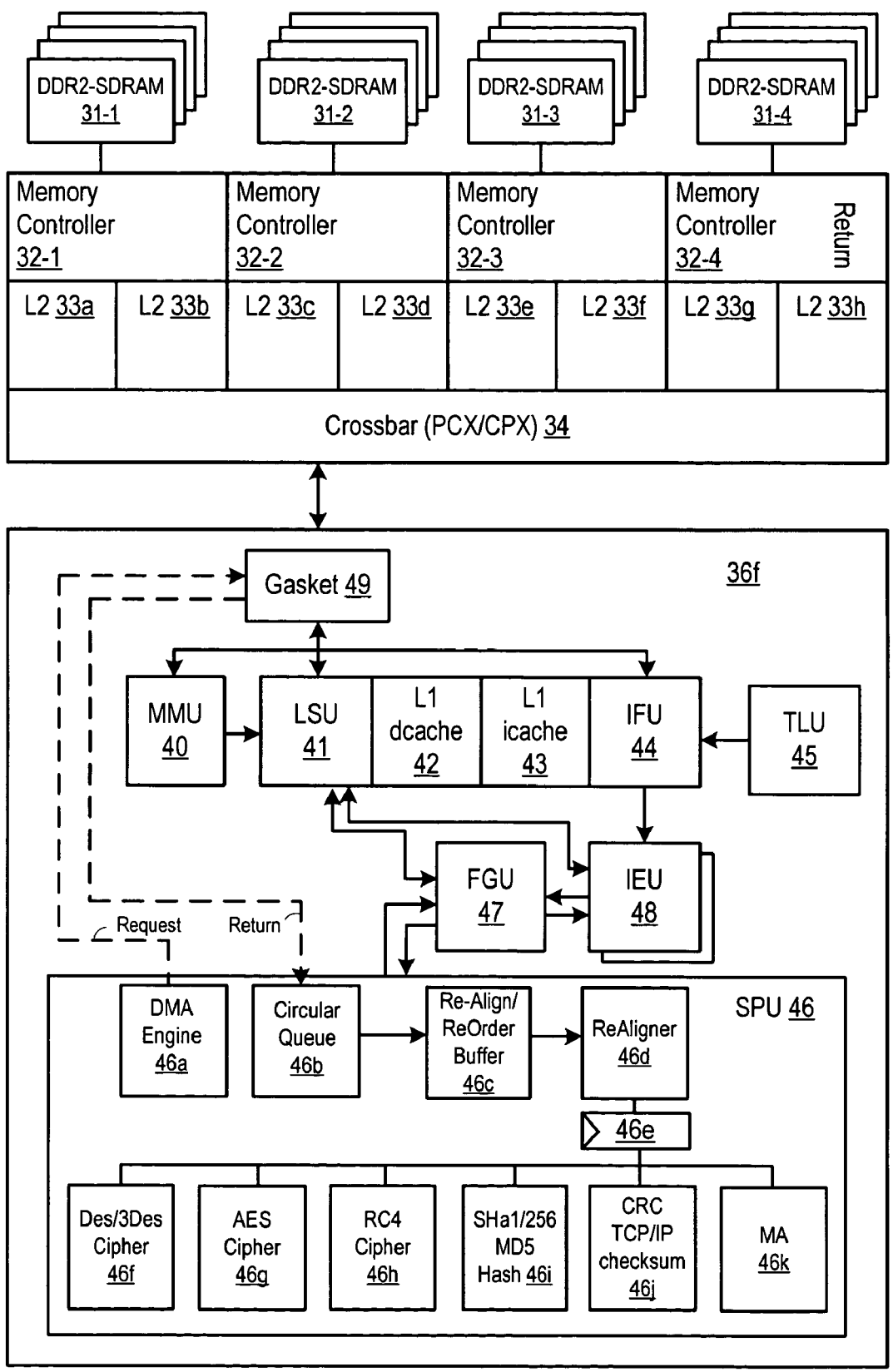
FIG. 6 is a system block diagram illustrating details relating to the functional components of the stream processing unit for issuing memory requests and for managing data returns in accordance with the present invention.

FIG. 6 is a generalized illustration of the interaction of the functional components of the SPU 46 with the gasket 49. The SPU 46 comprises a DMA engine 46a that is operable to generate memory requests to the L2 caches and a circular queue 46b that is operable to store the load data returned by the L2 caches, as described in more detail hereinbelow. The requests are addressed-based and, therefore, are directed to a particular L2 cache. The task of directing the request to a particular L2 cache is managed by the gasket 49 in conjunction with the crossbar 34. The requests are generated by the DMA engine 46a in a predetermined order and the returned data generally needs to be processed in the order in which the requests were issued. As will be understood by those of skill in the art, however, the L2 caches may not return the data in the same order that the requests are generated. Indeed, because various L2 caches service requests from multiple processor cores, it is very common for the L2 caches to return the data in a different order than the requests are generated.

In the method and apparatus of the present invention, each request comprises a destination queue identification (ID) tag indicating the destination queue that has been reserved to store the load data in the circular queue 46b. When the load data is returned from a particular L2 cache via the gasket 49, the destination queue ID tag is reflected back to the SPU with the returned data and is used to control which queue within the circular queue 46b will be used to store the load data. In one embodiment of the present invention, a total of eight 128-bit queues are implemented in the circular queue module 46b, although a different number of queues and different size queues can be implemented within the scope of the present invention.

Figure 7:
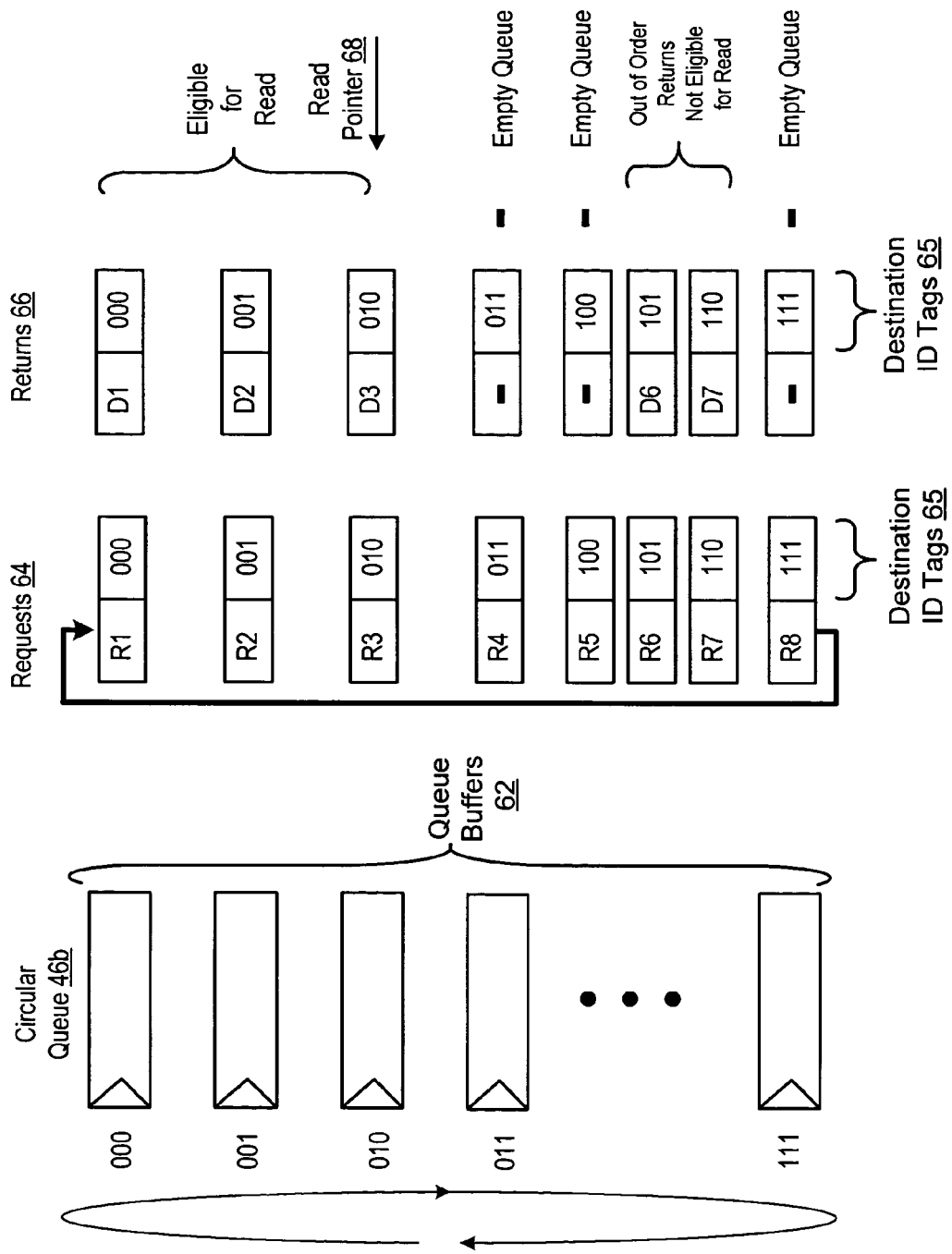
FIG. 7 is an illustration of a circular queue comprising a plurality of queue buffers for managing data return in response to requests issued by the stream processing unit of the present invention.

FIG. 7 illustrates a plurality of queue buffers 62 in the circular queue 46 shown in FIG. 6. The circular queue 46b comprises eight queues with addresses illustrated in binary form starting with 000 and ending with 111. For illustration purposes, a plurality of requests 64 and returns 66 are illustrated to correspond to requests made by the DMA engine 46a and load data received by the circular queue module 46b, respectively. The queues 62 have been illustrated with addresses 000-111 corresponding to addresses for each of the eight queues used in an embodiment of the present invention. As was discussed hereinabove, the requests 64 are issued by the DMA engine 46a in a specific order. In the illustration of FIG. 6, each of the queues 62 are shown with a corresponding request being denoted by "R," e.g., R1 corresponding to request 1 and R8 corresponding to request 8. Likewise, the returns 66 are illustrated with some of the queues having received data, e.g., D1, D2, D3, while empty queues are denoted by a "-".

In the present invention, the queue destination for a load data response is designated at the time the request is made. This is illustrated in FIG. 7 by a request destination ID tag 65 for each of the requests 64. As will be understood by those of skill in the art, data entries cannot be removed from a queue as fast as they can be loaded in. Therefore, it is necessary to have an available queue to store the load data before a request can be issued by the DMA engine 46a. The number of requests that can be issued is limited by the number of unused queue buffers 62 in the circular queue 46b.

Requests are issued with destination queue ID tags starting at 000 and proceeding sequentially until destination tag 111 is issued. The destination queue ID tag order then returns to 000 so long as a corresponding queue in the circular queue 46a is available. As was discussed hereinabove, the returned load data is transmitted with the destination queue buffer ID tag which identifies the particular queue buffer that is used to store the load data.

The data stored in the queues is processed out in the order that the queue addresses were established by the DMA engine. The reorder pointer 68 represents the last available queue buffer that contains data that is available to be read. If more than one of the contiguous queue buffers contain data, the ordered block of queue buffers can be processed all the way to the last queue buffer that contains data, as designated by the reorder pointer 68. For example, using the reorder pointer 68 in FIG. 7 as an example, the load data D1, D2, and D3 in corresponding queue buffers 000, 001, and 010 can be processed.

The SPU 46 is adapted to work with particular block sizes and the corresponding load data stored in the circular queues may or may not be aligned properly to allow processing by the SPU. For example, in some instances, a particular data block may span across two queues. In this case, it is necessary to sense and to rebuild the block in order to obtain the load data in the desired order. In the present invention, a realign/reorder buffer 46c is used to collect data which is then realigned by the realigner module 46d, using techniques known to those of skill in the art. The realigner 46d generates a data block output that is stored in a single data block queue 46e, which in one embodiment of the invention stores a data block comprising 64 bits. The data block queue serves as the interface to SPU processing modules that are used to process various encryption/decryption algorithms, hash functions, checksum generation, and modular arithmetic. While various processing modules can be implemented depending on the specific design of the SPU, the processing modules in the embodiment of the present invention include: 1) a Data Encryption Standard (DES) and Triple Data Encryption Standard (3DES) module 46*f*; 2) an Advanced Encryption Standard (AES) cipher module 46*g*; 3) a Ron's Code #4 (RC4) stream cipher module 46*h*; 4) Secure Hash Algorithms (SHA-1, SHA-256) and Message Digest (MD5) Algorithm module 46*i*; 5) a Cyclic Redundancy Check (CRC) and TCP/IP checksum module 46*j* and 6) a Modular Arithmetic (MA) module 46*k*.

While the present invention has been particularly described with reference to FIGS. 1-7 and with emphasis on certain memory and data processing structures, it should be understood that the figures are for illustration purposes only and should not be taken as limitations upon the present invention. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A single chip multithreaded processor, comprising:
   a plurality of processor cores, wherein each core supports multiple data processing threads;
   a plurality of second level cache memories coupled to said plurality of processor cores for storing or loading data; and
   a stream processing unit in at least one of said plurality of processor cores, comprising:
   a direct memory access module operable to generate a memory request to at least one of said plurality of second level caches, wherein said memory request comprises a destination queue buffer identification tag; and
   a circular queue module comprising a plurality of queue buffers operable to store load data returned by said at least one of plurality of second level caches in response to said memory request, wherein said returned load data is stored in a predetermined queue buffer corresponding to said destination queue buffer identification tag;
   wherein said direct memory access module issues a plurality of requests in a predetermined order and wherein said destination queue buffer identification tags correspond to predetermined destination queue buffers in said circular queue module for receiving load data returned by said plurality of second level caches; and
   wherein said circular queue module further comprises a reorder read pointer that points to a queue buffer in the circular queue module that contains last returned load data, wherein all queue buffers in front of the queue buffer pointed to by the reorder read pointer in the circular queue contain returned load data.

2. The single chip multithreaded processor of claim 1, wherein the plurality of processor cores comprises at least eight processor cores, wherein each core supports at least eight threads.

3. The single chip multithreaded processor of claim 1, wherein said circular queue in said stream processing module comprises eight queue buffers.

4. The single chip multithreaded processor of claim 1, wherein said returned load data stored in said destination queue buffers is stored in an order corresponding to the order in which said memory requests were issued by said direct memory access engine.

5. The single chip multithreaded processor of claim 4, wherein said returned load data stored in said destination queue buffers is processed in the order in which said memory requests were issued by said direct memory access engine.

6. The single chip multithreaded processor of claim 1, further comprising means for realigning data stored in said plurality of queue buffers in said circular buffer.

7. The single chip multithreaded processor of claim 1, wherein said stream processing unit is arranged to process data in a predetermined block size, and further wherein said processor comprises a realigner configured to generate an output data block stored in a single block queue for use by a processing module.

8. The single chip multithreaded processor of claim 7, wherein said data stored in said single block queue is provided to an encryption/decryption data processing module.

9. The processor of claim 1, wherein the queue buffer pointed to by the reorder read pointer is nearer to a tail of the circular queue than any other queue buffer in the circular queue that both contains returned load data and is separated within the circular queue from a head of the circular queue only by queue buffers containing returned load data.

10. The processor of claim 1, wherein the reorder read pointer points to a queue buffer that is different from a queue buffer at the tail of the circular queue.

11. In a single chip multithreaded processor comprising a plurality of processor cores, a circular queue buffer in at least one of said plurality of processor cores and a plurality of second level cache memories, a method of processing data, comprising:
   issuing a memory request from one of said plurality of processing cores to one of said plurality of second level cache memories, wherein said memory request comprises a destination queue buffer identification tag;
   receiving load data returned by one of said plurality of second level cache memories in response to said memory request, wherein said returned load data is stored in a predetermined queue buffer in said circular queue corresponding to said destination queue buffer identification tag; and
   designating with a reorder read pointer a queue buffer in the circular queue, wherein the queue buffer designated by the reorder read pointer contains returned load data, and is separated within the circular queue from a head of the circular queue only by queue buffers containing returned load data.

12. The method of claim 11, wherein said multithreaded processor comprises at least eight processor cores, wherein each core supports at least eight threads.

13. The method of claim 11, wherein at least one of said plurality of processing cores in said multithreaded processor comprises a stream processing unit in and wherein said memory request is issued by a direct memory access engine in said stream processing unit.

14. The method of claim 13, wherein said circular queue is in said stream processing unit.

15. The method of claim 14, wherein said circular queue comprises eight queue buffers.

16. The method of claim 14, further comprising issuing a plurality of requests to said plurality of second level cache memories in a predetermined order wherein said destination queue buffer identification tags correspond to predetermined destination queue buffers in said circular queue for receiving load data returned by said plurality of second level caches.

17. The method of claim 16, further comprising storing said returned load data in said predetermined destination queue buffers in an order corresponding to the order in which said memory requests were issued.

18. The method of claim 17, further comprising processing said returned load data stored in said destination queue buffer in the order in which said memory requests were issued.

19. The method of claim 18, further comprising using a reorder read pointer to designate a last queue buffer containing returned load data available for processing.

20. The method of claim 19, wherein return data is processed in a predetermined block size and further wherein data stored in separate queue buffers corresponding to a predetermined data block is realigned and stored in a single block queue.

21. The method of claim 19, wherein the reorder read pointer points to a queue buffer that is different from a queue buffer at the tail of the circular queue.

22. The method of claim 11, wherein the queue buffer designated by the reorder read pointer is nearer to a tail of the circular queue than any other queue buffer in the circular queue that both contains returned load data and is separated within the circular queue from the head of the circular queue only by queue buffers containing returned load data.

* * * * *